April 21, 1953 — J. B. TIEDEMANN — 2,635,770
METHOD OF UNLOADING STORED MATERIAL AND APPARATUS THEREFOR
Filed June 13, 1949 — 5 Sheets-Sheet 1

INVENTOR.
Julius B. Tiedemann
BY Andrus & Sceales
ATTORNEYS.

April 21, 1953    J. B. TIEDEMANN    2,635,770
METHOD OF UNLOADING STORED MATERIAL
AND APPARATUS THEREFOR
Filed June 13, 1949    5 Sheets-Sheet 2

INVENTOR.
Julius B. Tiedemann
BY Andrus & Sceales
ATTORNEYS.

April 21, 1953 — J. B. TIEDEMANN — 2,635,770
METHOD OF UNLOADING STORED MATERIAL AND APPARATUS THEREFOR
Filed June 13, 1949 — 5 Sheets-Sheet 4

INVENTOR.
Julius B. Tiedemann
BY Andrus & Seales
ATTORNEYS.

April 21, 1953

J. B. TIEDEMANN

2,635,770

METHOD OF UNLOADING STORED MATERIAL
AND APPARATUS THEREFOR

Filed June 13, 1949

INVENTOR.
Julius B. Tiedemann
BY Andrus & Sceales
ATTORNEYS.

Patented Apr. 21, 1953

2,635,770

UNITED STATES PATENT OFFICE 2,635,770

METHOD OF UNLOADING STORED MATERIAL AND APPARATUS THEREFOR

Julius B. Tiedemann, Milwaukee, Wis., assignor to A. O. Smith Corporation, Milwaukee, Wis., a corporation of New York Application June 13, 1949, Serial No. 98,794

14 Claims. (Cl. 214—17)

This invention relates to a method of unloading stored materials such as a fibrous type like silage for animals from a storage structure and to apparatus for accomplishing the removal process. The invention may have application also to the unloading of granular materials which tend to stick together or become packed.

One object of the invention is to provide a method of removing stored materials from the bottom of a storage structure wherein the method of removal is carried out in a manner reducing the stresses normally built up in the lower wall of the structure by removal of stored material from the bottom.

Another object is to provide a method of removing stored materials from the bottom of a storage structure which is directed to holding the thickness of the metal of the structure to a minimum.

Another object is to provide a method of removing stored material from the bottom of a storage structure wherein the removal is accomplished in a manner effecting movement of the stored material to the bottom of the structure to make stored material available in the bottom of the structure for removal in the amounts desired.

Another object of the invention is to provide a method of removing stored materials from the bottom of a storage structure maintained substantially airtight with the entry of air held to a minimum.

Another object is to provide an unloading unit for the bottom of a storage structure which can be inserted inside the structure after filling thereof and thereby eliminate problems attendant upon initially starting unloading a heavy column of material stored in the structure and resting on the unloader.

Another object of the invention is to provide an unloader which will break up and disintegrate the material stored in the structure for removal, in the event it is material which naturally entwines, or material which balls up under freezing or other storage conditions.

A further object is to provide an unloader for the bottom of a storage structure which is adapted to remove substantially all the material stored in the structure.

Another object is to provide an unloader unit for the bottom of a storage structure in which the discharge apparatus discharging the material to the outside of the structure is protected against the weight of the mass of the material stored in the structure and being unloaded by the unit.

These and other objects of the invention will appear hereinafter in connection with the following description of the drawings illustrating an embodiment of the invention.

The invention in general comprises a method of removing stored material from the bottom of a storage structure to prevent building up of stresses in the wall of the structure and of effecting removal of stored material in a manner to dislodge the material so that there is a supply of material made readily available at the bottom of the structure for removal therefrom. In addition, the invention is directed to apparatus which may be employed to carry out the method of the invention.

The invention is illustrated as employed with a generally cylindrical structure such as a silo and which, as shown, comprises a plurality of cylindrical steel sections 1 joined together at joints 2. The top of the silo structure is closed by cover 3 and the lowermost cylindrical section is secured to a flat topped foundation 4 of cement or the like providing a floor for the structure. Joints 2 are sealed by suitable cementing material to make the structure substantially airtight. The silo has a small opening 5 in the lower portion of the wall thereof for insertion of the unloader apparatus 6, to be described, into the trough 7 provided in the foundation or floor of the silo and extending from opening 5 to substantially the center of the structure.

Although different types of animal or human feed or other substances may be stored in a silo like that shown in the drawings, tests for arriving at the method of the invention have been carried out on corn silage stored in a silo structure capable of holding 150 tons of silage.

It has been found that when silage is unloaded from the bottom of a structure, such as the silo shown in the drawings, the silage remaining in the structure does not remain static but obtains a state of motion and realignment of the particles thereof as the mass shifts downwardly within the silo to occupy the space vacated by the silage just removed. Internal pressures in the structure cannot be predicated by movement and realignment of the silage particles after unloading bottom layers as the movement of the mass is effected by numerous conditions, such for example, if only a portion of the lowermost silage is removed around the circumference of the structure. Little if any control can be exercised over the variables present. As a result, it has been found that the silage can arrange itself in such a pattern within the structure as to exert tremendous pressures at concentrated areas tending to bulge the wall of the silo outwardly.

Figure 13:
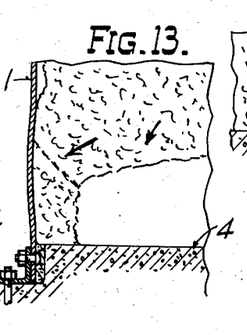
Fig. 13 is a view similar to Fig. 12 illustrating the problem the method of the invention overcomes.
Figure 14:
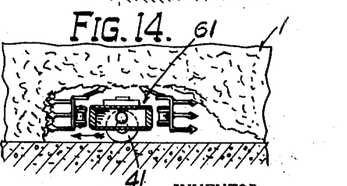
Fig. 14 is a section taken on line 14—14 of Fig. 11.
Figure 15:
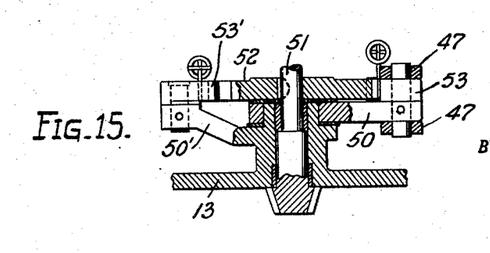
Fig. 15 is a detail view partially in section, showing the relation between the rachet wheel and the stationary and reciprocating pawls associated therewith.

In experiments in unloading silos it has been found, for example, as shown in Fig. 13, that if a ring of silage in excess of a predetermined width is permitted to remain around the circumference of the floor of the silo in the corner between the floor and wall that the silage upon moving downwardly tends to pass across the ring of silage and exert a wedging action thereon in a radial direction forcing the lower portion of the wall of the silo outwardly under high pressures difficult to predict. The silage ring remaining packs harder and harder as removal of the silage continues. Fig. 13 also illustrates the forming of a cavity found in the silage slightly above the corner ring of silage and indicating packing of the silage against the ring formed in the corner of the structure.

In one experiment carried out to determine the conditions existing at the base of a silo, which was fourteen feet in diameter and forty feet high, the ring of silage remaining after removal of a layer of silage was ten to eleven inches wide and approximately seven inches high. With this condition present, as the cutter arm 8 of unloader 6 cut through the 108° to 144° sector of the silage to the right of doorway opening 5, a bulge in the silo wall developed by previous unloading receded one-eighth of an inch. On cutting through the sector of 144° to 216° to the right of the opening 5, the bulge in the wall caused therein by previous unloading first grew and then receded perhaps .030 of an inch at the most. The cutter arm of unloader 6 then completed the 360° cut. Less than fifteen minutes after the cutter arm had completed the 360° cut, considerable strain was evident in the area from 144° to 216°. A snapping noise accompanied the growth of the shell of the structure, and a dial indicator mounted on the wall of the silo showed a growth of .070 in 45 minutes. This growth appeared in an area extending from 144° to 252° to the right of opening 5, being a maximum from 144° to 216°. The section of the silo wall from 0° to 144° did not move outwardly although it had originally been stretched and had receded. An hour after completing the cut, the swelling had stopped and during the following night no more occurred even though the silage settled three and one-half inches.

From these and other experiments in the unloading of silage it was thought that the lower section of the silo would have to be made of considerably heavier steel than the upper portion which would increase costs substantially and yet not be positive insurance against rupture at the base of the structure due to the unpredictability of the internal stresses developed.

Figure 12:
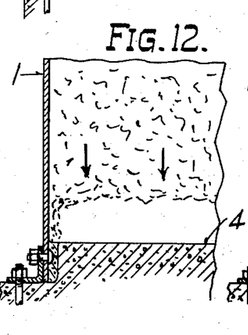
Fig. 12 is a detail view of the lower left portion of Fig. 11.

However, further experiments indicated that if the ring of silage, previously described, as present around the base of the silo were reduced to such a size that it offered no effective wedging surface subject to the pressures of downwardly moving silage to bulge the wall of the structure radially outwardly, the stresses described could be eliminated. In these same experiments it was also found that the silage tended to bridge over or arch at the bottom of the structure after removal of silage. In cutting away the ring of silage, the base of the arch supporting the column of silage was substantially removed with the result that the silage fell much more readily. Thus in the experiments referred to it was found that if the width of the ring of silage remaining ranged from one to two and one-half inches in a silo fourteen feet in diameter and forty feet high, that the tendency of the structure to bulge out at the base was substantially eliminated and a condition was present such as that illustrated in Fig. 12.

In carrying out the method of the invention, an unloading apparatus such as the apparatus 6 has been employed. This apparatus is adapted to be inserted into the bottom of the silo into trough 7 in the floor 4 thereof after the silo is filled. The trough 7 extends, as described, to the center of the silo from the door opening 5 so that apparatus lodged therein can cut the stored material equidistant progressively around the structure.

In general, unloader 6 comprises a rectangular shaped elongated base 9 having side flanges to support the unloader on the floor within trough 7 and a raised center section to enclose a portion of the driving mechanism for the unloader and provide a track around which the discharge conveyor 10 operates to carry the silage to the outside of the structure.

The dislodging and unloading portion of unloader 6, in general comprises two parts, namely the endless conveyor 10, previously described, which carries the dislodged silage from the structure and the cutter arm 8 which is rotated around the inside of the structure and carries a revolving endless conveyor chain 11 for dislodging silage, and an eccentrically agitated cutter bar 12 to also aid in the dislodging of silage.

The mechanism for operating these members of the unloader is located on the top of housing 13 which is secured to base 9 on the outside of the structure. The driving mechanism comprises the electric motor 14 which is secured to the transmission housing 15 in turn supported on housing 13 by the cylindrical housing 16.

Motor 14 through a belt and pulleys is connected to the transmission shaft 17 which extends horizontally through the transmission housing 15 and is geared to the bevel gear 18 within housing 15. Bevel gear 18 is secured to the upper end of vertical shaft 19 which rotates in suitable bearings within cylindrical housing 16.

Sprocket 20 is located within the housing 13 and is secured to the lower end of shaft 19 for rotation therewith. At the forward end of the unloader, a sprocket 21 in horizontal alignment with sprocket 20 is provided at the lower part of the hub 22 which rotates on suitable bearings supported on the cylinder 23 provided as part of the base 9 of the unloader. The endless conveyor 10 is assembled on sprockets 20 and 21 and revolves around the unloader from one end to the other normally in a counter-clockwise direction to discharge silage. Housing 16 is adjustable longitudinally of the housing 13 to tighten conveyor chain 10 on its sprockets.

The teethed paddles or hooks 24 are secured to conveyor 10 intermittently along the length thereof to carry off the silage which falls into trough 7, to the outside of the structure.

Hub 22 carries the sprocket 25 at the upper end which is in horizontal alignment with the sprocket 26 of shaft 27 secured for rotation in suitable bearings within the outer end of cutter arm 8. The endless chain 11 is assembled over sprockets 25 and 26 and is rotated around the cutter arm by rotation of hub 22 such as in a counter-clockwise direction when discharge conveyor 10 is rotated from motor 14, as described. Cutter-hooks 28 are secured to chain 11 at spaced locations to dig into the silage and dislodge the same as chain 11 rotates.

Cutter arm 8 is formed of upper and lower vertically spaced elongated frame members 29 which are secured at the inner end to the relatively thick support plate 30 which extends between members 29 for a short distance. Plate 30, in turn, is bolted to the upper flanged end of the vertical drive shaft 31 which extends upwardly through cylinder 23 of base 9, and the drive for which will be described hereinafter.

The cutter arm 8 tapers to a lesser cross-section at the outer end and projects from the unloader to within a few inches of the wall of the silo.

Shaft 27 at the outer end of arm 8 rotates within suitable bearings secured within the forked arm 32 which projects from frame members 29. An externally threaded rod 33 extends inwardly from arm 32 and is supported for longitudinal adjustment between the frame members 29. Rotation of nuts 34 on the threaded portion of rod 33 adjusts arm 32 inwardly and outwardly to tighten or loosen chain 11 on sprockets 25 and 26 or adjust the length of the cutter arm 8 to locate the cutter arm so that the cutter hooks 28 of chain 11 will operate within the desired distance of the wall of the silo in order to remove silage and prevent the building up of stresses in the shell and to effect falling of the silage, as described.

The upper end of shaft 27 is provided as an eccentric 35 which projects slightly above the upper surface of top frame member 29.

The elongated cutter bar 12 is secured at the outer end to eccentric 35 and at the inner end is slidably retained by a strap 36 which extends across the bar and is secured to support plate 30 by bolts 37. Spaced bearing plates 38 are located beneath bar 12 on top of frame 29 to provide a supporting surface over which the bar can oscillate.

A plurality of teeth 39 are located on each side of bar 12 and around the outer periphery so that when the bar oscillates in contact with silage, the bar saws and dislodges the same. The eccentric 35, of course, rotates upon rotation of shaft 27 to produce the oscillating movement of bar 12.

The table 40 on a level with floor 4 of the foundation is secured to base 9 beneath cutter arm 8 to cover trough 7. Table 40 is of a width to extend across the width of trough 7 and extends to a line removed from the inner end of the unloader. Cutter arm 8 when in operation conveys the silage to the inner end of trough 7 where it is engaged and conveyed for discharge by conveyor 10 through trough 7, beneath table 40.

Cutter arm 8 is supported for rotation about the silo on the support plate 30 and also the wheel 41 which is secured to frame members 29 near the outer end and rides on table 40 and the floor 4 of the foundation of the silo. The oscillating cutter bar 12 keeps the top of the cutter arm generally free of the mass of silage moving down to the unloader to prevent stalling of the unloader in its forward progress around the silo.

Figure 1:
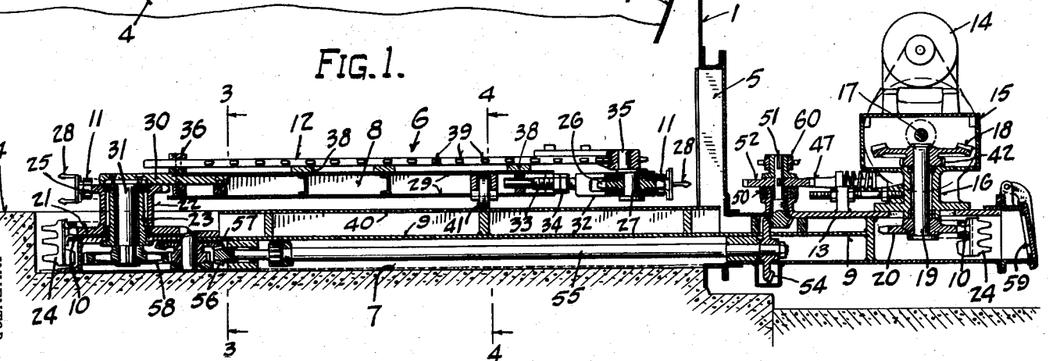
Figure 1 is a longitudinal sectional view of an apparatus employed in carrying out the method of the invention.
Figure 2:
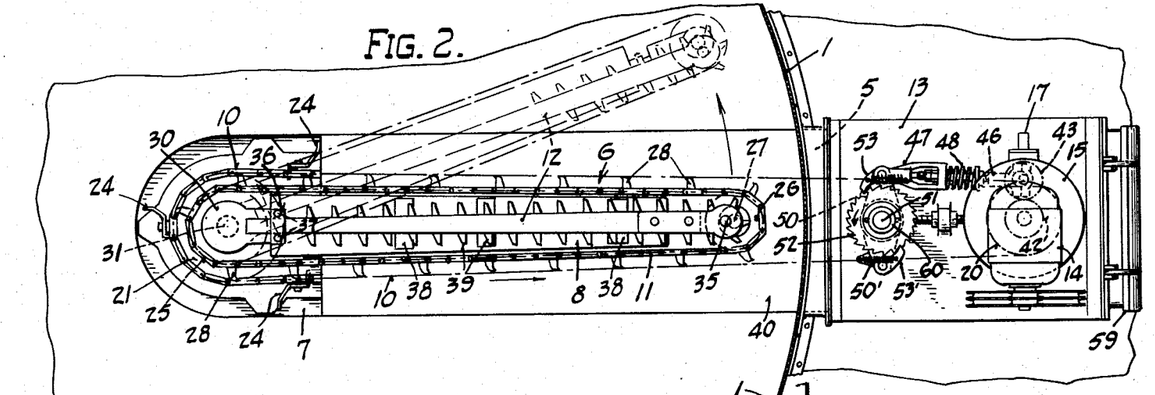
Fig. 2 is a top plan view of the unloader of Fig. 1 illustrating in dash lines a rotated position of the cutter arm.
Figure 3:
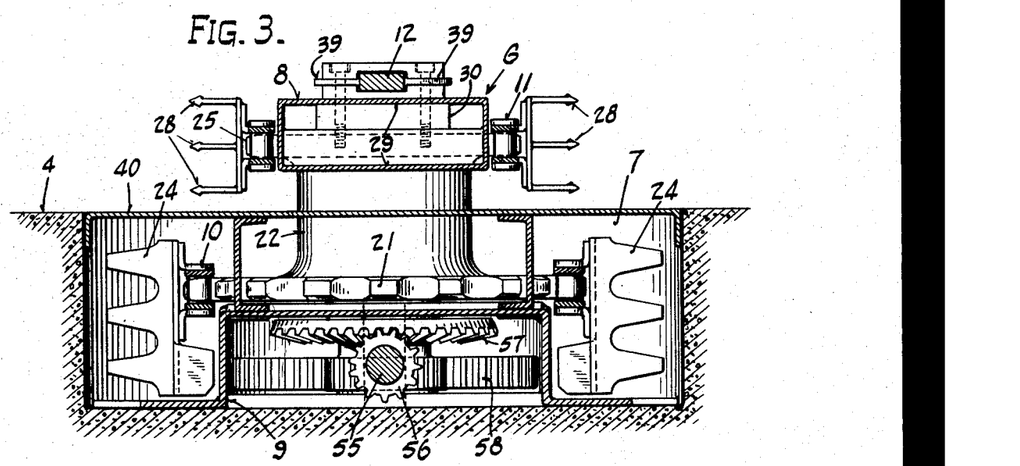
Fig. 3 is a section taken on line 3—3 of Fig. 1.
Figure 4:
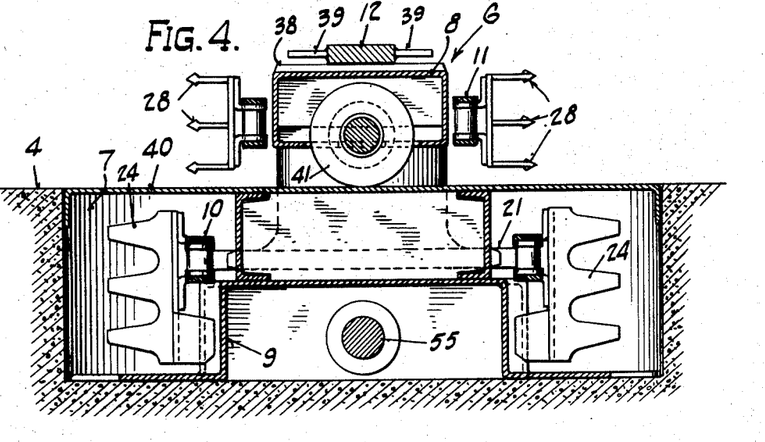
Fig. 4 is a section taken on line 4—4 of Fig. 1.
Figure 5:
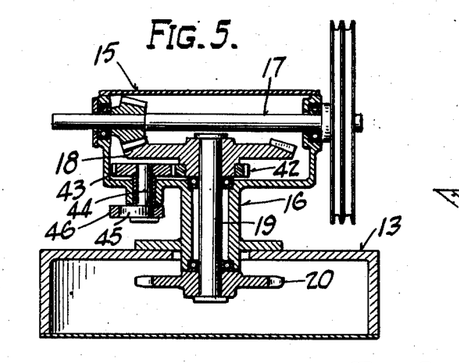
Fig. 5 is a detailed section through the driving eccentric for the pawl rotating the cutter arm.

The mechanism for rotating the cutter arm about the silo is driven from motor 14. The small gear 42 is secured to the hub of the bevel gear 18 within transmission housing 15. Gear 42 meshes with gear 43 which is secured to the vertical eccentric shaft 44 to rotate the same within a suitable supporting bearing in the housing 15, as shown in Fig. 5.

Figure 6:
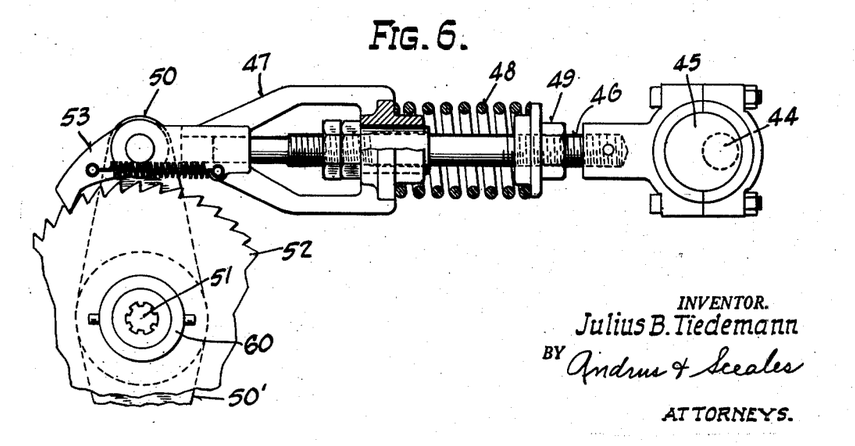
Fig. 6 is a detail of the pawl feed.

The eccentric 45 on shaft 44 is engaged by the connecting rod 46, the outer end of which extends within the ratchet arm 47 and is secured thereto, as illustrated in Fig. 6. The coil spring 48 encircles rod 46 as it extends from ratchet arm 47 and is confined between the rear end of arm 47 and nut 49 which is threaded onto connecting rod 46. The purpose of this assembly will be described hereinafter. The outer end of arm 47 is pivoted to rocker arm 50 which is journalled on a vertical bearing portion of the housing 13. A vertical pinion shaft 51 extends through the bearing portion and is keyed to a ratchet 52 disposed adjacent the ratchet arm 47. A pawl 53 is pivoted to the end of the rocker arm 50 and also to the end of ratchet arm 47 for reciprocation therewith. A second pawl 53', which is pivotally mounted opposite pawl 53 on a stationary arm 50 serves to prevent the ratchet 52 from moving backwardly after it has been rotated by the reciprocating pawl 53. The pawls 53 and 53' are normally spring-pressed into engagement with the ratchet 52 and may be manually moved out of engagement with the teeth of the ratchet.

Ratchet 52 rotates the pinion shaft 51 and the pinion of the shaft at the lower end meshes with the gear 54 rotating on a horizontal axis within base 9. The pinion of shaft 51 is disposed within housing 13 in its meshing contact with gear 54, and shaft 51 is enclosed by a cylindrical housing extending upwardly from housing 13.

Gear 54 is secured to the rotating shaft 55 which extends within base 9 to adjacent the inner end of the unloader where the rod is connected to the pinion gear 56 meshing with a gear 57 rotating on a vertical axis and having a pinion which meshes with the gear 58 secured to the lower end of the drive shaft 31, previously described, for rotating the cutter arm 8. The numerous gears described substantially reduce the R. P. M. of the motor finally transmitted to cutter arm 8 through drive shaft 31 so that the arm revolves around the bottom of the structure at a slow rate of speed up to approximately 3.24 revolutions per hour.

After the silo is filled and when the unloader is located so as to work its way into trough 7 through door 5, cutter arm 8 is disposed directly above the base 9 of the unloader. The pawls 53 and 53' are at this time disengaged from ratchet 52 so that the cutter arm cannot revolve. When filling a structure the unloader will normally be outside the structure since it has been found that it is easier to work the unloader into the silage after filling rather than to start the unloader inside the structure with the great mass of the material pressing down upon it after initial filling of the structure. By entering the unloader into the structure after initial loading a lighter weight and considerably less expensive unloader can be employed.

After the unloader is in place inside the structure opening 5 is closed off, by a suitable panel and housing 13 of the unloader. The outer end of the housing 13 of the unloader is closed by door 59 when the unloader is not in operation to prevent entry of air to the structure. The prevention of entry of air by the unloader is an important function as the air is harmful to the silage. Bottom unloading of a silo permits more effective prevention of air entry than in the case where the structure is unloaded from the top.

When the unloader is in operation pawls 53 and 53' are engaged with ratchet 52 to drive the same and rotate the cutter arm through the gear train previously described. In the drawing the cutter arm 8 is illustrated as rotating in a counterclockwise direction. In such direction of revolution chain 11 revolves around arm 8 in a counterclockwise direction to dislodge and convey silage to the center of the silo where it is engaged by conveyor 10 and discharged from the silo through trough 7, the door 59 being open at this time.

As the arm 8 progressively advances around the bottom of the silo it may be obstructed in its progress due to the packing thereagainst of silage or other material being unloaded. If this occurs the cutter arm 8 stops its forward progress and connecting rod 46 previously described deflects coil spring 48 rather than driving ratchet arm 47. The spring 48 is set to deflect when a predetermined pressure is exerted on cutter arm 8. The conveyor chain 11 on arm 8 continues to revolve even though the cutter ceases to advance. As soon as the obstructing silage is removed by the chain, coil spring 48 again operates ratchet arm 47 and drives ratchet 52 to rotate cutter arm 8 through the gear train mechanism described. The cutter arm as described is also adjustable in length to handle different service conditions.

If it should be desirable to revolve cutter arm 8 manually a crank, not shown, may be applied to the crank sleeve 60 which is secured to the top of the pinion shaft 51 to crank the cutter arm in either a clockwise or counter-clockwise direction. Upon movement of the arm in the clockwise direction the pawls 53 and 53' would have to be disengaged from the ratchet 52.

Figures 7, 8:
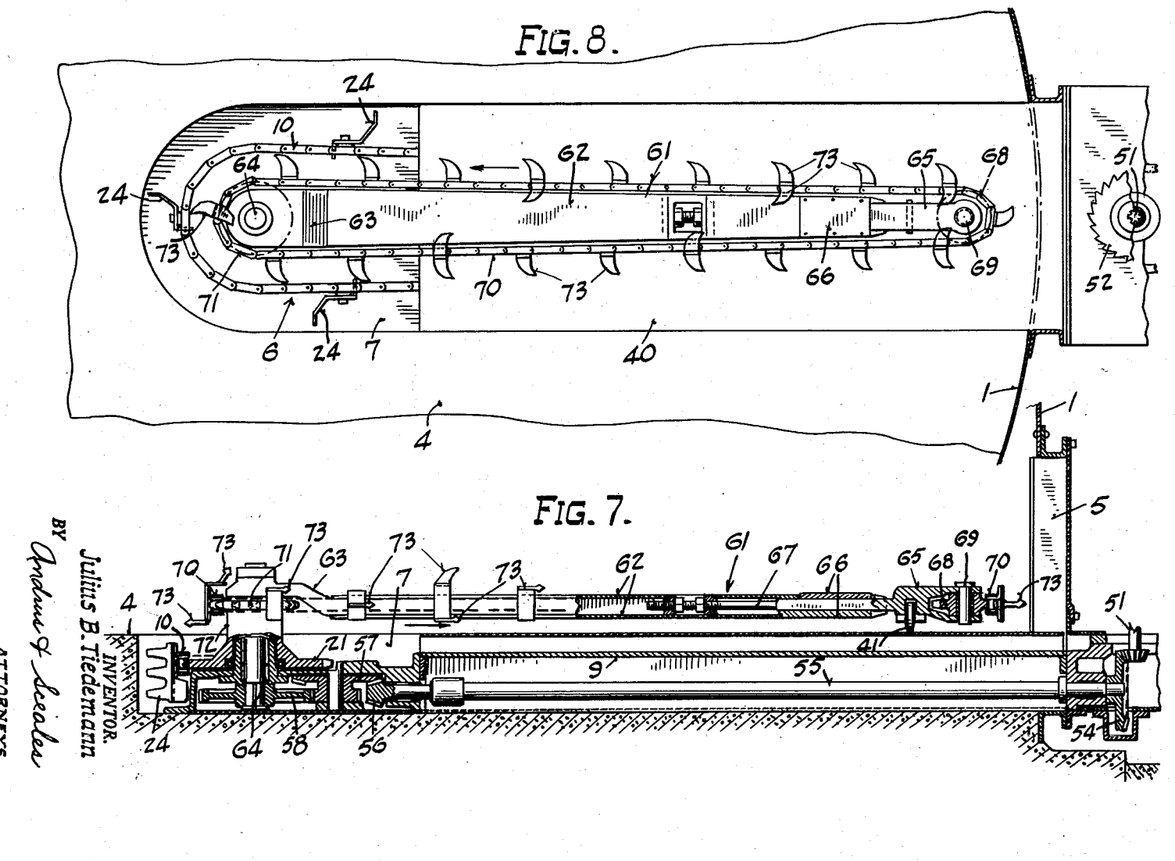
Fig. 7 is a view similar to Fig. 1 illustrating the arm of another embodiment of the invention and with the parts in elevation.
Fig. 8 is a top plan view of Fig. 7.

In the embodiment of the invention illustrated in Figs. 7 and 8, the construction of the unloader remains the same except for cutter arm 61 which corresponds to cutter arm 8. In this embodiment the cutter arm is considerably narrower than in the previous embodiment and the arm tapers to a generally narrow cross-section at the outer end.

Cutter arm 61 in general comprises the spaced frame plates 62 which are welded to the center hub 63. Hub 63 is secured to the upper end of the drive shaft 64 which corresponds to drive shaft 31 of the previous embodiment.

The sprocket fork 65 is located at the outer end of arm 61 and projects inwardly between the clamping plates 66 one of which is welded to the frame plates 62. The spindle 67 is secured to the inner end of fork 65 and is adapted to be adjusted longitudinally for slight adjustment of the length of the cutter arm to locate the arm within the correct distance of the wall of the structure to carry out the method of the invention as described.

The sprocket 68 is supported on vertical pin 69 for rotation within the outer end of cutter arm 61. The endless cutter chain 70 extends around arm 61 between sprocket 68 and the sprocket 71 on the sprocket hub 72 which corresponds to hub 22 in the previous embodiment.

The cutter hooks or lugs 73 are secured to cutter chain 70 along the length thereof to cut into the silage. The hooks 73 are secured to the chain in staggered relation to take smaller bites into the silage. For example, the forward hook may be attached near the bottom of the chain, the next hook intermediate to the rear of the forward hook and the next hook at the top of the chain to the rear of the intermediate hook. It is important to prevent climbing of the chain that these hooks extend horizontally. Additional hooks 73 extend on a slant over the upper surface of the arm and at the outer narrower end of the arm the upper hooks in passing around the arm on chain 70 extend substantially across the am. By this construction the top of the cutter arm is maintained substantially free of silage and there is no danger of silage lodging on the arm which cannot be reached and removed and that the mass of silage will press down upon the arm and prevent forward progress thereof. The cutter bar 12 of the previous embodiment is entirely eliminated under the construction of the present embodiment.

Figure 9:
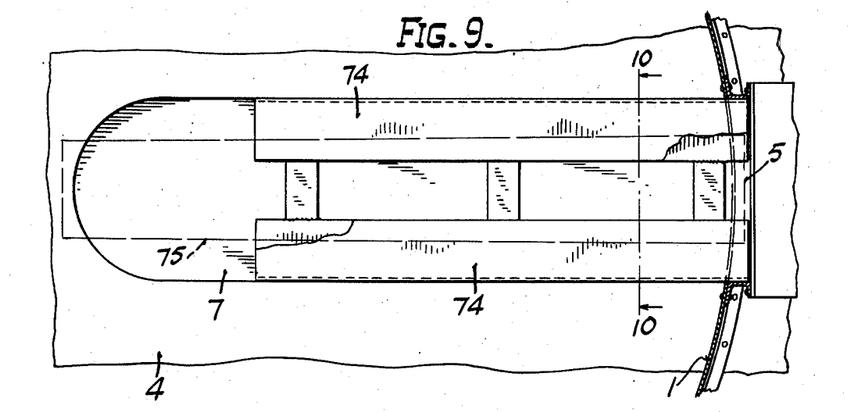
Fig. 9 is a top plan view illustrating a trough insert employed separate from the unloader with a cover indicated by dash lines.
Figure 10:
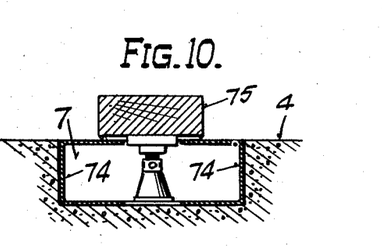
Fig. 10 is a section on line 10—10 of Fig. 9 showing a cover in place.
Figure 11:
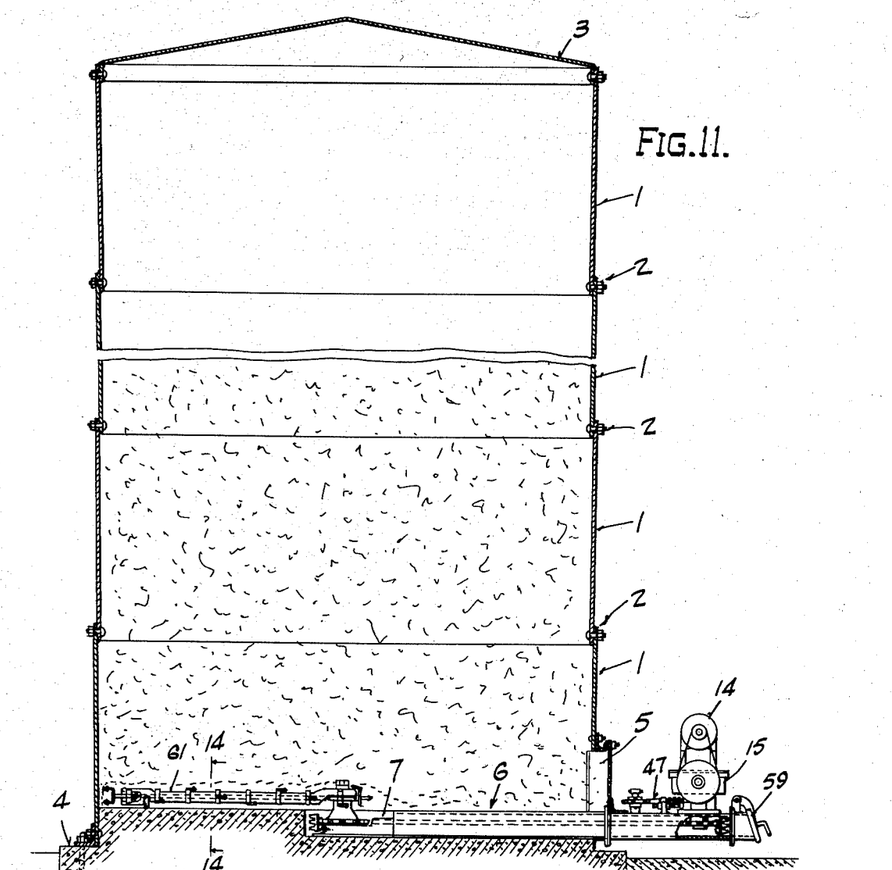
Fig. 11 is a sectional view of a silo with an unloader mechanism in place and illustrating the method of the invention and the results obtained thereby.

Figs. 9 and 10 illustrate a construction in which the channeled members 74 are located in trough 7 and extended inwardly from the door opening 5 to a line removed from the end of the trough. The members 74 are separated at the top for insertion of the upper portion of the unloader apparatus therethrough but are joined at the bottom by spaced pieces welded thereto. The cover 75 may be disposed over the longitudinal opening between members 74 during filling of the silo and is adapted to be removed for insertion of the unloader. When channeled members 74 are employed, a plate member on the unloader, not shown but similar to table 40, is provided to fill the gap between the upper flanges of channel member 74.

The invention provides a method of unloading a structure from the bottom in which is stored material tending to entwine due to its fibrous structure or ball up and pack under certain operating conditions, in which internal stresses tending to bulge the lower portion of the wall of the structure are held to a minimum and the stored material drops readily in the quantities desired. In addition the invention provides one type of apparatus which may be employed to carry out the method of the invention which has features particularly adapting it for employment as an unloader in the bottom of a storage structure.

Although the unloader of the invention is shown as employed in the bottom of a storage structure like a silo it may be employed with other structures and used at different levels within such structures other than the bottom of the structure. The unloader also may be employed to transfer material such as compost about a compost making structure without removing the compost therefrom.

Various embodiments of the invention may be employed within the scope of the accompanying claims.

I claim:

1. The method of removing stored material from the bottom of a storage structure supported on a foundation providing a floor for the bottom of the structure which comprises opening the side wall of the structure adjacent the bottom of the structure for access to the lower layers of the material, entering through said opening and cutting a radial path through the material to the center of the structure, then engaging and cutting away the base of the material progressively around the structure to within a distance of the wall of the structure to effect generally rapid falling of the material to the bottom thereof, and simultaneously moving the dislodged material inwardly toward the center of the structure and from thence outwardly along said radial path for discharge through said opening in the wall of the structure to the outside thereof.

2. The method of removing stored material from the bottom of a storage structure supported on a foundation providing a floor for the bottom of the structure which comprises opening the side wall of the structure for access to the lower layers of the material resting on said floor, entering a power cutter through said opening and working the cutter inwardly along a radial path through the material to the center of the structure with the cutter cutting and removing material as the cutter moves inwardly, then moving a cutter member on the power cutter progressively around the structure within a predetermined distance of the wall of the structure to cut and dislodge the stored material, and simultaneously moving the material inwardly toward the center of the structure and from thence outwardly along said radial path for discharge through said opening in the wall of the structure to the outside thereof.

3. Apparatus for unloading stored material from the bottom of a structure having a confining wall to receive the material with the wall supported on a foundation providing a floor for the structure, which comprises a base, a conveyor mounted on said base and disposed to rotate to carry off the stored material, a radial member pivoted to the inner end of the base and disposed to rotate around the inside of the structure, cutter means connected to the radial member and adapted to cut over the top and laterally of said radial member and to remove the material tending to press against the radial member and obstruct the rotary movement of said radial member around the structure, and power means connected to said conveyor and to said radial member and cutter to drive the conveyor, radial member and cutter in service.

4. Apparatus for unloading stored material from the bottom of a structure having a confining wall to receive the material with the wall supported on a foundation providing a floor for the structure, which comprises a base, a conveyor mounted on said base and disposed to rotate to carry off the stored material, an arm pivoted to the base and disposed to rotate around the inside of the structure, an endless conveyor mounted on said arm and disposed to rotate around the same, cutters on said second conveyor extending over the top of said arm and adapted upon rotation of said last named conveyor to cut and dislodge material settling on said arm and obstruct the forward movement thereof, and power means connected to said conveyors and to said arm to rotate the same when the apparatus is in operation.

5. In apparatus for removing material from the bottom of a storage structure, a base, a cutter arm pivoted to said base and driven around the bottom of the structure in contact with the material stored therein, a cutter chain mounted on said arm and driven around the same to dislodge material, and cutter members secured to said chain and extending over the upper surface of the cutter arm intermittently around the entire arm to cut and remove material tending to settle on said arm and obstruct the movement of the arm into contact with stored material.

6. Apparatus for unloading stored material from the bottom of a structure having a confining wall to receive the material with the wall supported on a foundation providing a floor for the structure, which comprises a base, an endless conveyor mounted on said base and disposed to rotate around the same to carry off the stored material, an arm pivoted to the inner end of the base and disposed to rotate around the inside of the structure, a second endless conveyor mounted on said arm and disposed to rotate around the same, cutter hooks mounted on said second conveyor and extending over the top of said arm intermittently around the entire arm and driven by said second conveyor to cut and dislodge material settling on said arm and tending to obstruct the forward movement thereof, and power means connected to said endless conveyors and to said arm to rotate the same when the apparatus is in operation.

7. Apparatus for unloading stored material from the bottom of a structure having a confining wall to receive the material supported on a foundation providing a floor for the structure, which comprises a base mounted on the floor of the structure through an opening in the wall and extending to approximately the center of the structure, a drive shaft disposed at the outer end of said base, a pivot shaft mounted vertically of the inner end of the base at approximately the center of the structure, an arm member mounted upon the upper end of the pivot shaft and projecting therefrom for a substantial distance in vertically spaced relation with said base and to within a predetermined distance of the wall of the structure, a hub mounted for rotation on said pivot shaft, an endless conveyor extending along the base and mounted on the drive shaft and lower end of said hub, a shaft mounted for rotation at the outer end of the arm member and having an eccentric provided at the upper end projecting above said arm member, a second endless conveyor mounted on the upper end of said hub and engaging the said shaft at the outer end of the arm member, a cutter bar mounted on the eccentric of the shaft of the arm member and extending over the top of the arm member, power means to rotate the drive shaft to drive the conveyors and cutter bar in engagement with the stored materials to dislodge and discharge the same from the structure, and means operated by said power means to rotate the arm member about the bottom of the structure when the conveyors and cutter bar are being driven.

8. Apparatus for unloading stored material from the bottom of a generally vertically disposed cylindrical structure secured to a foundation providing a flat floor for the structure, which comprises a base disposed on said floor and extending through an opening in the wall of the structure to substantially the center of the structure, frame means mounted on the inner end of the base and providing an arm for rotation about said structure, a pair of sprockets journaled at the inner end of the base on a common member, a sprocket journaled at the outer end of the arm member and at the outer end of said base, a conveyor chain extending between one of the sprockets journaled at the inner end of the base and the sprocket journaled at the outer end of said base, a second conveyor chain extending between the other of said sprockets journaled at the inner end of the base and the sprocket journaled at the outer end of said arm, cutter hooks secured to the second conveyor and projecting substantially outwardly from the frame means intermittently around the entire arm provided by said frame means to engage the stored material at a distance removed from the arm and power means to drive the sprocket at the outer end of the base to rotate said conveyors about their respective sprockets for discharge from the structure of stored material.

9. Apparatus for unloading stored material from the bottom of a storage structure having a confining wall to receive the material supported on a foundation providing a floor for the structure having a trough extending from an opening in the wall to substantially the center of the structure to permit entry of the unloading apparatus into the structure after the structure is filled, a base mounted on the floor of the structure within said trough, an endless conveyor mounted to rotate around said base within the trough, a cutter arm pivoted to the inner end of the base and disposed to rotate around the inside of the structure, a second endless conveyor mounted on said arm for rotation therearound with hooks thereon spaced intermittently and secured thereto at different heights outwardly around the arm a substantial distance, and power means outside the structure and connected to said arm and conveyors to rotate the same when the apparatus is installed in the bottom of a storage structure.

10. Apparatus for unloading stored material from the bottom of a storage structure having a confining wall to receive the material supported on a foundation providing a floor for the structure having a trough extending from an opening in the wall to substantially the center of the structure, a base mounted on the floor of the structure within said trough, an endless conveyor mounted to rotate around said base within the trough, a cutter arm pivoted to the inner end of the base and disposed to rotate around the inside of the structure, a second endless conveyor mounted on said arm for rotation therearound, power means outside the structure and connected to said arm and conveyors to rotate the same when the apparatus is installed in the bottom of a storage structure, and resilient means connected to said power means and set at a predetermined pressure to absorb the drive of said power means upon obstruction of the movement of the cutter arm about the inside of said structure.

11. Apparatus for unloading stored material from the bottom of a storage structure having a confining wall to receive the material supported on a foundation providing a floor for the structure having a trough extending from an opening in the wall to substantially the center of the structure, a base mounted on the floor of the structure within said trough, an endless conveyor mounted to rotate around said base within the trough, an arm pivoted to the inner end of the base and disposed to rotate around the inside of the structure, a second endless conveyor mounted on said arm for rotation therearound, power means outside the structure and connected to said arm and conveyors to rotate the same when the apparatus is installed in the bottom of a storage structure, and a table-like member disposed beneath the arm member and on a level with the floor of the structure and extending from the opening inwardly to a line removed from the end of the trough to enclose the conveyor mounted on said base but leaving a passage to the conveyor at the inner end of the trough for passage therethrough to the conveyor of the material to be discharged.

12. Apparatus for unloading stored material from the bottom of a generally vertically disposed cylindrical structure secured to a foundation providing a generally flat floor for the structure, which comprises an endless conveyor rotating within a trough extending in the floor of the structure from the center thereof to an opening in the wall with paddle members intermittently secured thereto to carry off materials contacted by the conveyor, a frame member pivoted at the center of the structure and adapted to revolve circumferentially around the structure, a second endless conveyor mounted on the frame member above said first named conveyor and adapted to be revolved around said frame member, and hook members secured to said second conveyor intermittently therealong at different levels and extending over and away from the frame member a substantial distance to cut and loosen the material stored in the structure for conveyance into the trough at the center of the structure for removal by said first named conveyor through the wall opening.

13. In apparatus for transferring material about a material support within a storage structure, a base mounted on said support, a cutter arm pivoted to said base and driven over the support in contact with the material located therein, a cutter chain mounted on said arm and driven around the same in contact with the material located therein, and cutter hooks secured to said chain and extending therefrom into contact with said material to engage and transfer about the structure the material located therein, said hooks being secured to the cutter chain in staggered relation with the forward hook of a series of hooks being disposed in the lowermost position and the rear hook of said series being located in the uppermost position, and said rear hook in each series extending over the top of the arm to move over the entire top surface of the arm as the cutter chain revolves around the arm to cut away material tending to press against the arm and stall the same.

14. The method of removing stored material from the bottom of a storage structure supported on a foundation providing a floor for the bottom of the structure and with said structure having an opening in the wall thereof for discharge of the material, which comprises cutting a radial path through the material to the center of the structure substantially in line with said opening, then engaging and cutting away the base of the material progressively around the structure to within a distance of the wall of the structure to effect generally rapid falling of the material to the bottom thereof, and simultaneously moving the dislodged material inwardly toward the center of the structure and from thence outwardly along said radial path for discharge through said opening in the wall of the structure to the outside thereof.

JULIUS B. TIEDEMANN.

References Cited in the file of this patent

UNITED STATES PATENTS

| Number | Name | Date |
| --- | --- | --- |
| 1,226,412 | Thomas | May 15, 1917 |
| 1,274,548 | Holnagel et al. | Aug. 6, 1918 |
| 1,275,558 | Holmgreen | Aug. 13, 1918 |
| 1,482,524 | Robinson | Feb. 5, 1924 |